(12) United States Patent
Shirono

(10) Patent No.: US 8,787,744 B2
(45) Date of Patent: Jul. 22, 2014

(54) ELECTRICAL COMPONENT-ACCOMMODATING CASE AND IMAGING APPARATUS HAVING THE SAME

(71) Applicant: Samsung Electronics Co., Ltd., Suwon-si (KR)

(72) Inventor: Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/064,378

(22) Filed: Oct. 28, 2013

(65) Prior Publication Data

US 2014/0153914 A1   Jun. 5, 2014

(30) Foreign Application Priority Data

Dec. 4, 2012   (JP) .................................. 2012-265525
Jun. 10, 2013   (KR) ......................... 10-2013-0066060

(51) Int. Cl.
     *G03B 17/08*   (2006.01)
(52) U.S. Cl.
     USPC .......................................................... 396/25
(58) Field of Classification Search
     CPC ...................................................... G03B 17/08
     USPC ................................................. 396/25, 27, 29
     See application file for complete search history.

(56) References Cited

U.S. PATENT DOCUMENTS

| | | | | |
|---|---|---|---|---|
| 5,968,386 | A * | 10/1999 | Goenka et al. | 219/209 |
| 6,597,865 | B1 * | 7/2003 | Negishi et al. | 396/25 |
| 7,060,921 | B2 * | 6/2006 | Kubo | 200/302.1 |
| 2011/0228083 | A1 * | 9/2011 | Su | 348/143 |
| 2012/0275025 | A1 * | 11/2012 | Parrill | 359/511 |
| 2013/0342746 | A1 * | 12/2013 | Ueda et al. | 348/333.01 |

FOREIGN PATENT DOCUMENTS

| | | |
|---|---|---|
| JP | 03-20326 U | 2/1991 |
| JP | 04-255176 A | 9/1992 |
| JP | 2006-047448 A | 2/2006 |
| JP | 2008-177844 A | 7/2008 |

* cited by examiner

*Primary Examiner* — Rodney Fuller
(74) *Attorney, Agent, or Firm* — Drinker Biddle & Reath LLP

(57) ABSTRACT

A case that accommodates electronic components therein is described. The case includes a plurality of parts that are configured to engage with each other by a snap-fit joint. At least one part of the plurality of parts includes a groove unit. A width of the groove unit is gradually reduced away from the snap-fit joint. The groove unit is formed in an inner surface of the at least one part of the plurality of parts.

12 Claims, 6 Drawing Sheets

ELECTRICAL COMPONENT-ACCOMMODATING CASE AND IMAGING APPARATUS HAVING THE SAME

CROSS-REFERENCE TO RELATED PATENT APPLICATION

This application claims the priority benefit under 35 U.S.C. §119(a) from Japanese Patent Application No. 2012-265525, filed on Dec. 4, 2012, in the Japanese Patent Office and Korean Patent Application No. 10-2013-0066060, filed on Jun. 10, 2013, in the Korean Intellectual Property Office, the disclosures of which are incorporated herein in their entirety by reference.

BACKGROUND

1. Field

The disclosure relates to an electrical component-accommodating case and an imaging apparatus having the same.

2. Related Art

Cameras having a water-tight structure to accommodate electronic components are known in the art.

Japanese Patent Laid-Open Publication No. 4-255176 discloses an electronic apparatus having a water-tight case. The case disclosed therein has a structure in which an opening unit provided on a main body of the case is covered by a lid. The case forms a water-tight structure by a protrusion unit that protrudes along an edge of the opening unit and a packing provided on the lid. Also, a space is provided on a lower side of the opening unit, and a moisture absorbent is disposed on a lower side of the space.

In Japanese Utility model Laid-Open publication No. 3-20326, a technique regarding a retractable type water-proof camera in which a body-tube emerges from a main body of the camera is described. According to the technique described therein, a ring-shaped space that surrounds a base unit of the body-tube is formed on a portion of the main body of the camera where the body-tube emerges. A ventilation unit that is connected to the outside for ventilation is formed on a wall that forms the space, and a moisture absorbent is disposed in the space. The ventilation unit includes a gas-passing member that allows passing of gas only.

In the technique disclosed in Japanese Patent Laid-Open Publication No. 4-255176, in order to make the case a water-tight structure, an assembling process may be more complicated because the lid must be precisely packed on the opening unit. Also, since a lid packing is formed of an elastic member, such as rubber having a specific cross-sectional shape, the lid packing is expensive, and accordingly, the case is higher in cost.

In the technique disclosed in Japanese Utility model Laid-Open publication No. 3-20326, since a gas-passing member is disposed in the ventilation unit and the moisture absorbent is disposed in the space, the number of parts to be used in the case is increased and processes for bonding the parts are needed, thereby increasing costs.

SUMMARY

Various embodiments provide a case that accommodates electrical components and is substantially water-proof and an imaging apparatus associated with the case.

According to an embodiment, a case accommodates electronic components. The case includes a plurality of parts that are configured to engage with each other by a snap-fit joint. At least one part of the plurality of parts includes a groove unit. A width of the groove unit is gradually reduced away from the snap-fit joint. The groove unit is formed in an inner surface of the at least one of the plurality of parts.

The groove unit may include a tip portion and an end portion. The end portion may be disposed farther than the tip portion from the snap-fit joint. A moisture-absorbing member may be installed in the end portion.

The tip portion of the groove unit may be located higher than the end portion of the groove unit.

The at least one part of the plurality of parts may include a first portion and a second portion. The second portion may have a thickness smaller than that of the first portion. The second portion may include a lower surface of the groove unit. Lateral surfaces of the first portion that are boundaries between the first portion and the second portion may include lateral surfaces of the groove unit.

The lateral surfaces of the groove unit may be curved surfaces.

The plurality of parts may include a lower part that includes a lower unit of the case and a plurality of upper parts that include an upper unit of the case. The lower part may be configured to engage with at least one of the plurality of upper parts by the snap-fit joint. The snap-fit joint may be formed so that an outer surface of the lower part extends higher than an inner surface of the lower part. The groove unit may be formed in the lower part.

According to another embodiment, an imaging apparatus has the case described above.

BRIEF DESCRIPTION OF THE DRAWINGS

The above and other features and advantages of the embodiments of the invention will become more apparent by describing in detail exemplary embodiments thereof with reference to the attached drawings in which.

DETAILED DESCRIPTION

Figure 1:
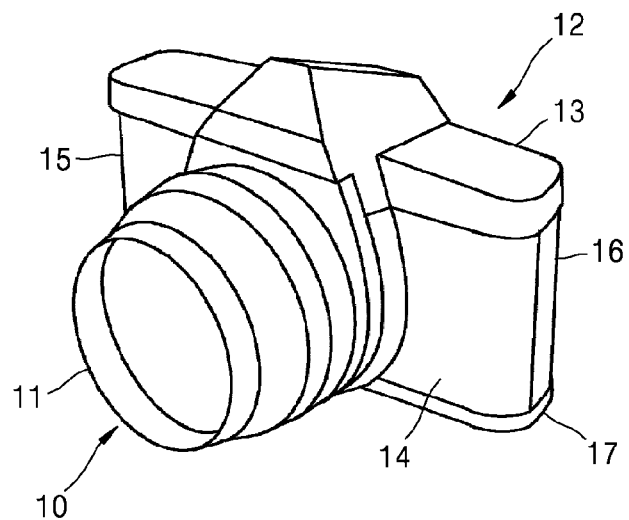
FIG. 1 is a perspective view of an imaging apparatus according to an embodiment.

The Japanese Industrial Standards ("JIS") define degrees of protection provided by enclosures ("IP code") to an electrical apparatus.

Of the defined IP codes, a second identification number of the code indicates first through sixth degrees of protection against the ingress of water, summarized below.

First class (Type I dripping water): Vertically falling drops shall have no harmful effect.

Second class (Type II dripping water): Vertically dripping water drops shall have no harmful effects when the enclosure is tilted at any angle up to 15° from the vertical.

Third class (Spraying water): Water falling as a spray at any angle up to 60° from the vertical shall have no harmful effect.

Fourth class (Splashing of water): Water splashed against the enclosure from any direction shall have no harmful effect.

Fifth class (Water jet): Water projected by a nozzle against the enclosure from any direction shall have no harmful effect.

Sixth class (Powerful water jet): Water projected in powerful jets against the enclosure from any direction shall have no harmful effect.

From the above specifications, for example, although water ingresses into an inner side of a case, if there is no harmful effect on electronic components, the case satisfies the first through sixth classes of the JIS specification. For example, in the first through sixth classes of the JIS specification, it is unnecessary to make a case into a completely water-tight structure. However, for example, although water ingresses into an inner side of a case, if the case has a structure that prevents water from penetrating into electronic parts installed in the case, the case satisfies the first through sixth classes of the JIS specification.

Hereinafter, embodiments will be described with reference to the accompanying drawings. In the specification and drawings, like reference numerals are used to indicate constituent elements that substantially have identical functions, and thus the detailed description thereof will not be repeated.

In the embodiments described below, a case has a structure that prevents electronic components included in the case from being damaged by water that ingresses into the case. Also, an imaging apparatus having the case will be described.

FIG. 1 is a perspective view of an imaging apparatus 10 according to an embodiment. The imaging apparatus 10 may include a lens unit 11, a case 12, and an imaging unit (not shown) accommodated inside the case 12.

The case 12 includes at least two parts that are configured to engage with each other. The case 12 may include a lower part 17 that forms a lower unit thereof and at least one upper part that forms an upper unit thereof. Engagement between at least one of the upper parts and the lower part 17 may be provided by at least one snap-fit joint. In the current embodiment, the upper part includes an upper surface part 13, a first front part 14, a second front part 15, and a rear part 16. The first front part 14, the second front part 15, and the rear part 16 may be engaged with the lower part 17 by a snap-fit joint 23 (FIG. 2).

Groove units 20 (refer to FIG. 2) are formed in an inner surface of at least one of the upper surface part 13, the first front part 14, the second front part 15, the rear part 16, or the lower part 17. In the current embodiment, a concave groove unit 20 is formed in an inner surface 17b of the lower part 17. The groove unit 20 may be formed not only on the lower part 17 but also in other parts of the case 12. Types of the groove units 20 will be described with reference to FIGS. 2 through 7.

Figure 2:
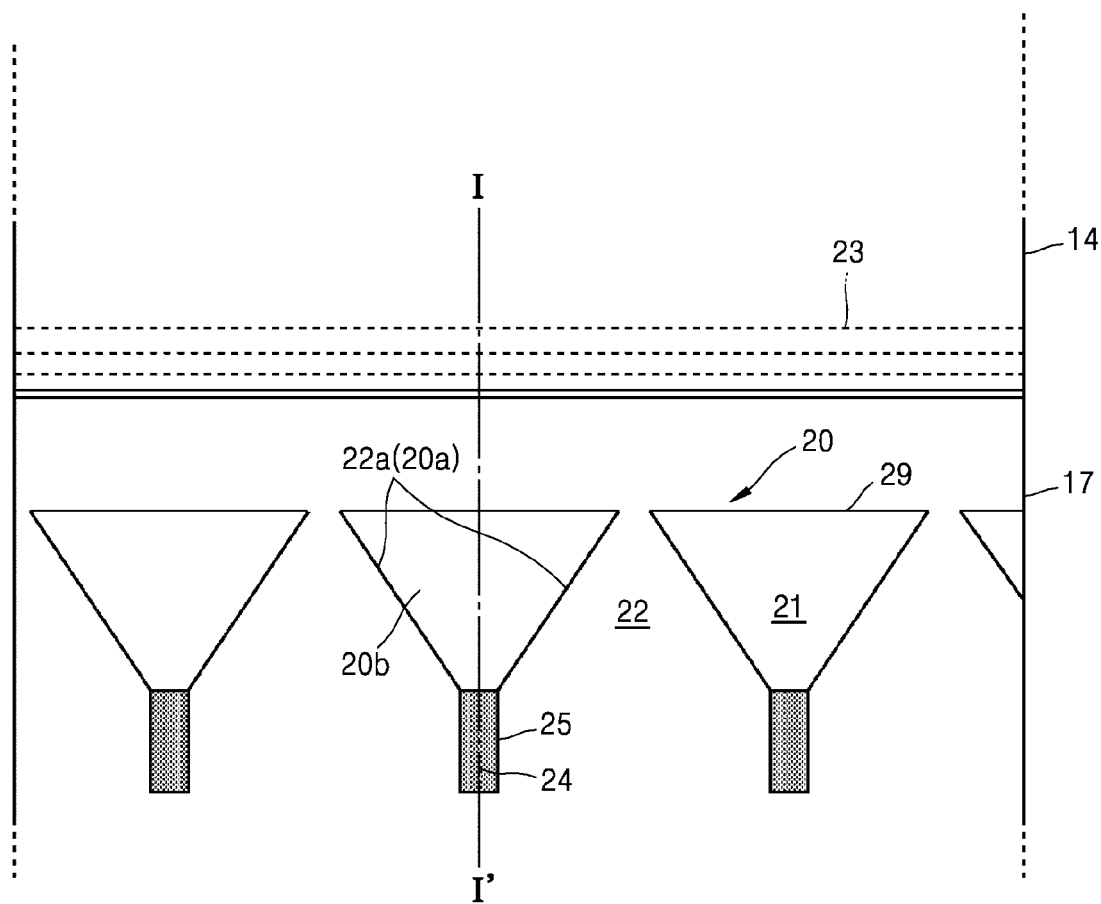
FIG. 2 is a cross-sectional view showing a groove unit in an inner surface of a lower part of an embodiment of a case.

FIG. 2 is a cross-sectional view showing the groove units 20 in the inner surface 17b of the lower part 17 of the case 12 of the imaging apparatus 10 of FIG. 1. Referring to FIG. 2, the groove unit 20 has a shape in which a width thereof is gradually reduced away from the snap-fit joint 23 between the lower part 17 and other parts, for example, the first front part 14.

In the current embodiment, since the groove unit 20 has a shape in which the width thereof is gradually reduced away from the snap-fit joint 23, water that ingresses into the case 12 through the snap-fit joint 23 is collected in a narrow end portion 24 of the groove unit 20 when the water flows away from the snap-fit joint 23. Accordingly, it is possible to flow water that ingresses into the case 12 in a predetermined direction, and thus, the penetration of water into a location where electronic components are accommodated in the case 12 may be prevented. Accordingly, the case 12 provides a substantially water-proof case at a low cost without increasing the number of parts or assembling processes.

A moisture-absorbing member 25 having, for example, a rectangular shape is installed on the narrow end portion 24, which is at a location farther from the snap-fit joint 23, for example, a location where the width of the groove unit 20 is at a minimum. Water that flows along the groove unit 20 may be kept within the groove unit 20 by using the moisture-absorbing member 25, and thus, a farther penetration of the water by overflowing into the case 12 may be prevented. The moisture-absorbing member 25 is not disposed in the snap-fit joint 23 but is disposed in the case 12. Accordingly, the location of the moisture-absorbing member 25 is not particularly limited when compared to another case in which the moisture-absorbing member is installed in the snap-fit joint, and thus, the assembling process may be less complicated.

Figure 3:
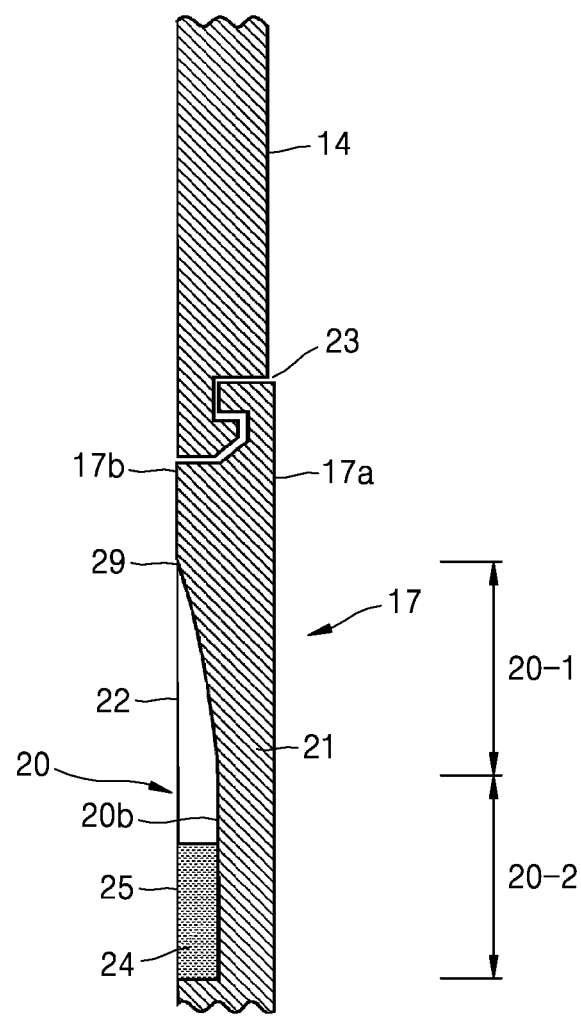
FIG. 3 is a cross-sectional view taken along line I-I' of FIG. 2.

The groove unit 20 will further be described in detail. FIG. 3 is a cross-sectional view taken along line I-I' of FIG. 2.

The lower part 17 is shown combined with the first front part 14 by the snap-fit joint 23. The shape of the snap-fit joint 23 depicted in FIG. 3 is only an example, and accordingly, the scope of the current embodiment is not limited to the shape of the snap-fit joint 23 depicted in FIG. 3.

Referring to FIGS. 2 and 3, the lower part 17 includes a first portion 22 and a second portion 21 having a thickness smaller than that of the first portion 22. The second portion 21 comprises a lower surface 20b of the groove unit 20. Lateral surfaces 22a of the first portion 22, which are boundaries with the second portion 21, comprise lateral surfaces 20a of the groove unit 20. A tip portion 29 of the groove unit 20 is a boundary between the first portion 22 and the second portion 21.

In the groove unit 20, the narrow end portion 24, in which the moisture-absorbing member 25 is installed, is formed lower than the tip portion 29 that is closer to the snap-fit joint 23 than the narrow end portion 24. Thus, water that ingresses into the snap-fit joint 23 may be readily collected in the moisture-absorbing member 25 installed in the groove unit 20. As depicted in FIG. 3, the groove unit 20 according to the current embodiment includes a first span 20-1 that is gradually deeper towards the narrow end portion 24 from the tip portion 29 and a second span 20-2 having a constant depth. However, the depth of the groove unit 20 according to the current embodiment is not limited to the depth depicted in FIG. 3. For example, the depth of the groove unit 20 may be gradually deeper towards the narrow end portion 24 from the tip portion 29, or may have a constant depth from the tip portion 29 to the narrow end portion 24.

In the lower part 17 in which the groove unit 20 is formed, the snap-fit joint 23 is formed such that an outer surface 17a of the lower part 17 extends or is located higher than an inner surface 17b of the lower part 17. In this way, water that ingresses through the snap-fit joint 23, more specifically, through a gap in the snap-fit joint 23 between the first front part 14 and the lower part 17, may be readily guided by the groove unit 20 along the inner surface 17b of the lower part 17.

Figure 4:
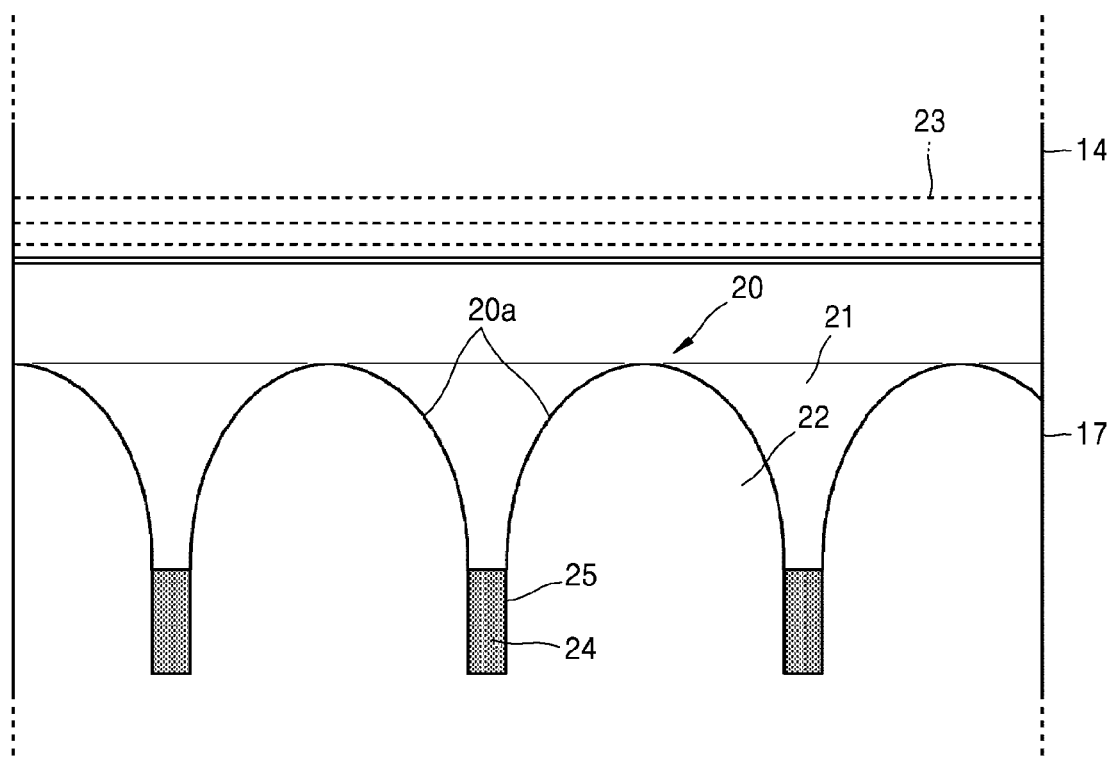
FIG. 4 is an enlarged cross-sectional view of curved lateral surfaces of the groove units.

Also, the lateral surfaces 20a of the groove unit 20 may not be flat surfaces. FIG. 4 is an enlarged cross-sectional view of curved lateral surfaces 20a of the groove unit 20. The lateral surfaces 20a of the groove unit 20 may be curved surfaces gradually enlarged towards the snap-fit joint 23 from a side of the groove unit 20 farther from the snap-fit joint 23, for example, from the narrow end portion 24 in which the moisture-absorbing member 25 is installed. In this case, the first portion 22 has a shape in which a plurality of portions of circumferences of semi-ovals are arranged in a row in a horizontal direction along the snap-fit joint 23, and the groove unit 20 is formed by gaps between the semi-ovals. When the lateral surfaces 20*a* of the groove unit 20 are formed as curved surfaces, a thickness of the case 12, for example, the first portion 22, may be increased. Accordingly, the groove unit 20 may be formed without substantially reducing the strength of the case 12.

Figure 5:
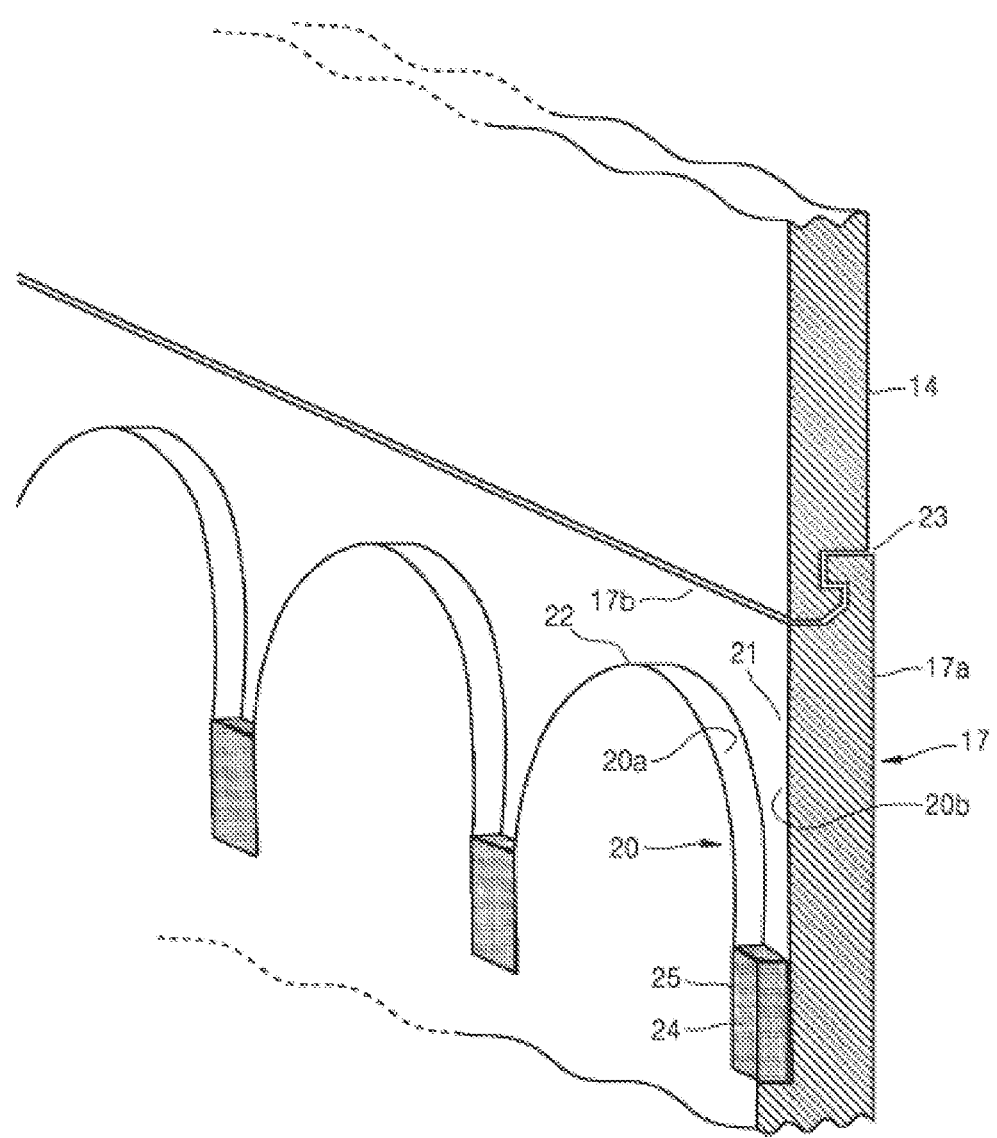
FIG. 5 is a perspective view of curved lateral surfaces of the groove units.

As depicted in FIG. 5, the second portion 21 may be extended to the snap-fit joint 23. FIG. 5 is a perspective view of curved lateral surfaces 20*a* of the groove unit 20. Referring to FIG. 5, the lateral surfaces 20*a* of the groove unit 20 are curved surfaces, and the second portion 21 extends to the snap-fit joint 23. In this case, the lower surface 20*b* of the groove unit 20 extends to the snap-fit joint 23.

Figure 6:
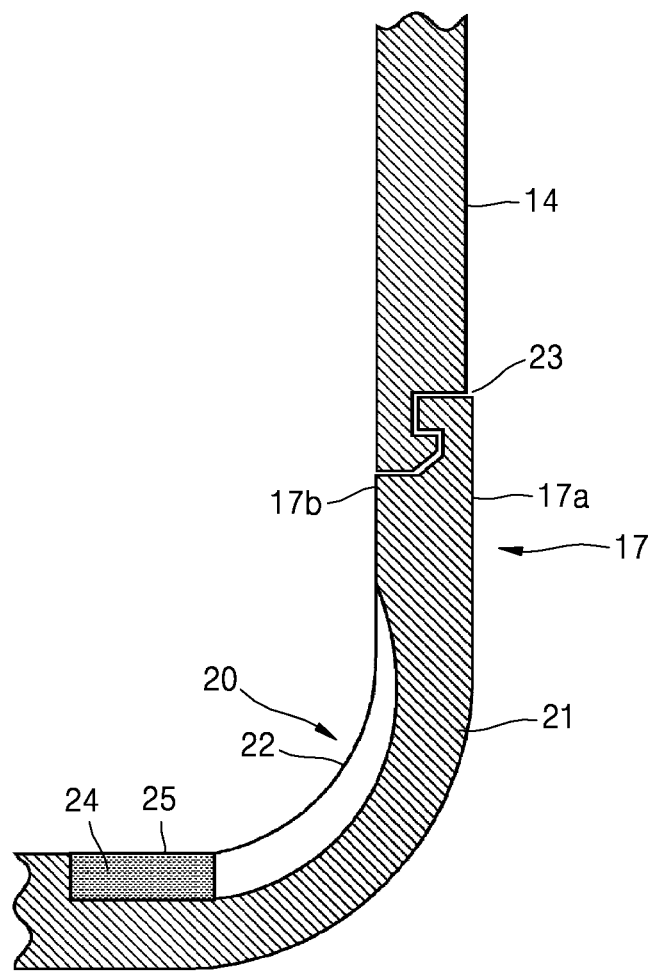
FIG. 6 is a cross-sectional view of the groove unit extending to a lower surface of the bottom part.
Figure 7:
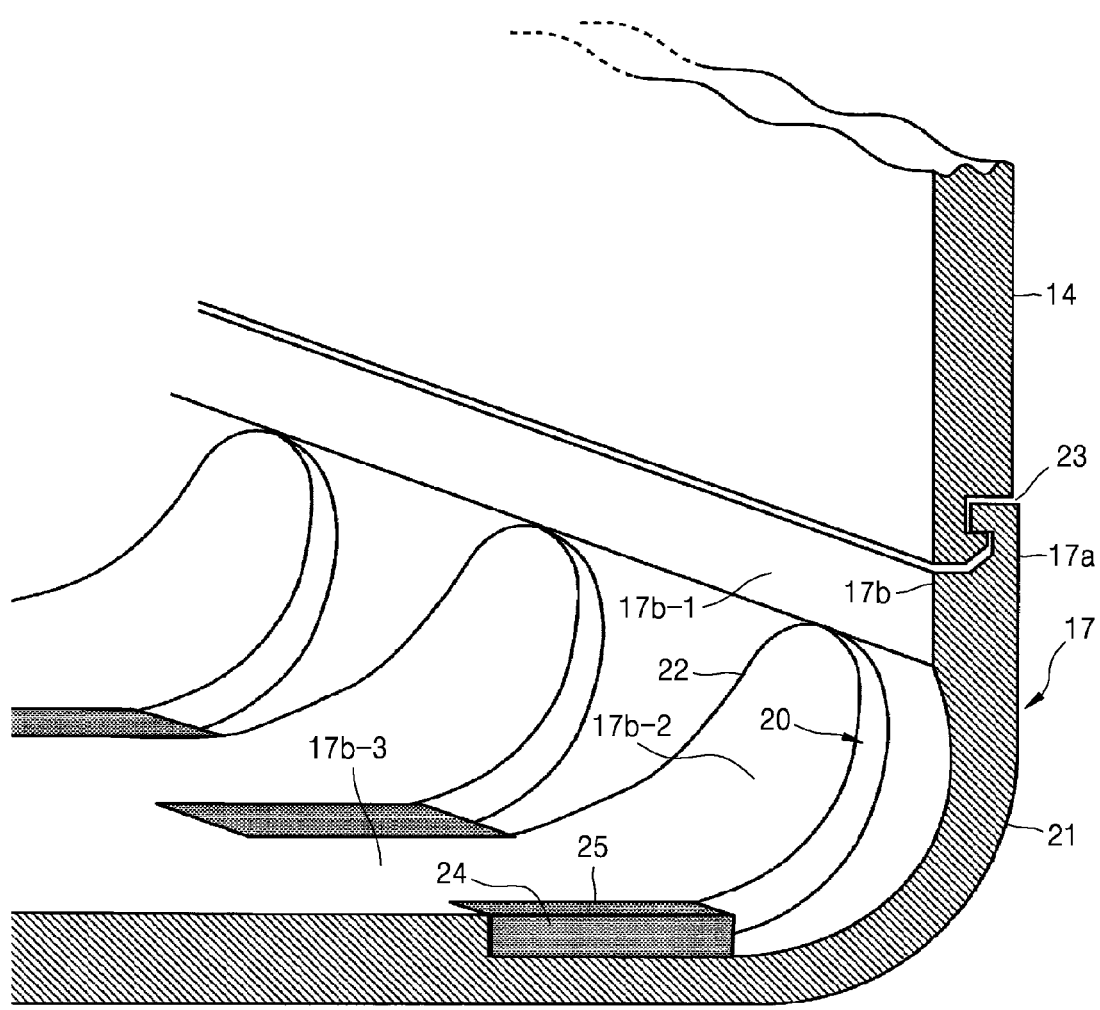
FIG. 7 is a perspective view of the groove unit extending to a bottom surface of the lower part.

The groove unit 20 may extend to a bottom surface 17*b*-3 of the lower part 17. FIG. 6 is a cross-sectional view of the groove unit 20 extending to the bottom surface 17*b*-3 of the lower part 17, and FIG. 7 is a perspective view of the groove unit 20 extending to the bottom surface 17*b*-3 of the lower part 17. Referring to FIGS. 6 and 7, the inner surface 17*b* of the lower part 17 may include a side surface 17*b*-1, a bottom surface 17*b*-3, and a curved surface 17*b*-2 that connects the side surface 17*b*-1 to the bottom surface 17*b*-3. The groove unit 20 is formed by beginning from the side surface 17*b*-1 to the bottom surface 17*b*-3 extending along the curved surface 17*b*-2 of the lower part 17. The moisture-absorbing member 25 may be a rectangular shape extending along the bottom surface 17*b*-3 of the lower part 17.

Water that ingresses through the combining unit 23 is kept in the groove unit 20 by being absorbed in the moisture-absorbing member 25 after flowing along the inner surface 17*b* of the lower part 17.

In the case 12 having the groove unit 20 according to the described embodiments, the ingress of water to electronic components accommodated in the case 12 may be prevented although the water ingresses inside the case 12. Accordingly, the case 12 does not need to have a strict water-tight structure, and thus, the case 12 may be formed at lower costs.

While various embodiments of the invention have been particularly shown and described with reference to exemplary embodiments thereof, it will be understood by those of ordinary skill in the art that various changes in form and details may be made therein without departing from the spirit and scope of the invention. For example, the snap-fit joint 23 having a water-tight structure may be formed by disposing an elastic member in a portion of a part of the snap-fit joint 23 of the case 12. Therefore, the spirit and scope of the invention is defined by the following claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A case that accommodates electronic components, the case comprising:
   a plurality of parts that are configured to engage with each other by a snap-fit joint,
   wherein at least one part of the plurality of parts comprises a groove unit, wherein a width of the groove unit is gradually reduced away from the snap-fit joint, wherein the groove unit is formed in an inner surface of the at least one part of the plurality of parts.

2. The case of claim 1, wherein the groove unit comprises a tip portion and an end portion, wherein the end portion is disposed farther than the tip portion from the snap-fit joint, and wherein a moisture-absorbing member is installed in the end portion.

3. The case of claim 2, wherein the tip portion of the groove unit is located higher than the end portion of the groove unit.

4. The case of claim 1, wherein the at least one part of the plurality of parts comprises a first portion and a second portion, the second portion having a thickness smaller than that of the first portion, wherein the second portion comprises a lower surface of the groove unit, wherein lateral surfaces of the first portion that are boundaries between the first portion and the second portion comprise lateral surfaces of the groove unit.

5. The case of claim 4, wherein the lateral surfaces of the groove unit are curved surfaces.

6. The case of claim 1, wherein the plurality of parts comprises a lower part that comprises a lower unit of the case and a plurality of upper parts that comprises an upper unit of the case,
   wherein the lower part is configured to engage with at least one of the plurality of upper parts by the snap-fit joint;

wherein the snap-fit joint is formed so that an outer surface of the lower part extends higher than an inner surface of the lower part; and wherein the groove unit is formed in the lower part.

7. An imaging apparatus having the case described in claim 1.

8. The imaging apparatus of claim 7, wherein the groove unit comprises a tip portion and an end portion, wherein the end portion is disposed farther than the tip portion from the snap-fit joint, and wherein a moisture-absorbing member is installed in the end portion.

9. The imaging apparatus of claim 8, wherein the tip portion of the groove unit is formed higher than the end portion of the groove unit.

10. The imaging apparatus of claim 7, wherein the at least one part of the plurality of parts comprises a first portion and a second portion, the second portion having a thickness smaller than that of the first portion, wherein the second portion comprises a lower surface of the groove unit, wherein lateral surfaces of the first portion that are boundaries between the first portion and the second portion comprise lateral surfaces of the groove unit.

11. The imaging apparatus of claim 10, wherein the lateral surfaces of the groove unit are curved surfaces.

12. The imaging apparatus of claim 7, wherein the plurality of parts comprises a lower part that comprises a lower unit of the case and a plurality of upper parts that comprises an upper unit of the case, wherein the lower part is configured to engage with at least one of the plurality of upper parts by the snap-fit joint, wherein the snap-fit joint is formed so that an outer surface of the lower part extends higher than an inner surface of the lower part, and wherein the groove unit is formed in the lower part.

* * * * *